United States Patent Office 3,338,885
Patented Aug. 29, 1967

3,338,885
CERTAIN AZIRIDINYL ETHYL CARBOXYLIC ESTERS
William P. Coker, Lake Jackson, Prella M. Phillips, Angleton, and Gordon R. Miller, Lake Jackson, Tex., assignors to The Dow Chemical Company, Midland, Mich., a corporation of Delaware
No Drawing. Filed Sept. 18, 1963, Ser. No. 309,865
9 Claims. (Cl. 260—239)

This invention relates to new compositions of matter containing an N-heterocyclic group and to the preparation of such compositions. More particularly, the present invention relates to (1-aziridinyl) alkyl esters of carboxylic acids and to the preparation of these compounds.

Esters of aziridinyl-carboxylic acids are known. Such compounds are disclosed in U.S. Patents 2,596,200 (Bestian), 2,824,857 (Drechsel) and 2,901,443 (Stark et al.). In these compounds, however, the aziridinyl radical forms part of the acyl group. Other esters which contain an aziridinyl group in the molecule are disclosed in British Patent 783,728 by Staub et al. in Angewandte Chemie, 73, 143 (1961) (α-vinyl-1-aziridineethanol acetate) and by Yoshida et al. in J. Chem. Soc. Japan, Ind. Chem. Sect., 55, 455–7 (1952) (α-methyl-1-aziridinemethanol acetate). Both of the two named esters contain a reactive group (a vinyl or aziridinyl group, respectively) on the carbon atom which is alpha to the non-oxo oxyyen atom. In addition, the compound gamma-ethyleneimino-propyl methacrylate is disclosed by Hendry et al. in the British Journal of Pharmacology and Chemotherapy, vol. 6, pages 357–410 (1951). Such compounds, however, either do not rearrange to form hydroxy compounds with a nitrogen atom directly attached to a carbonyl group (as do the 2-(1-aziridinyl)alkyl esters) or else rearrange very slowly.

It has now been discovered that (1-aziridinyl) alkyl esters can be conveniently prepared by an ester interchange reaction between an ester of a carboxylic acid and a (1-aziridinyl) alkanol compound, or a (1-aziridinyl) alkanol in which at least one carbon atom of the aziridinyl group is substituted.

The preparation of the compounds of the invention is based upon the following reaction:

(I)

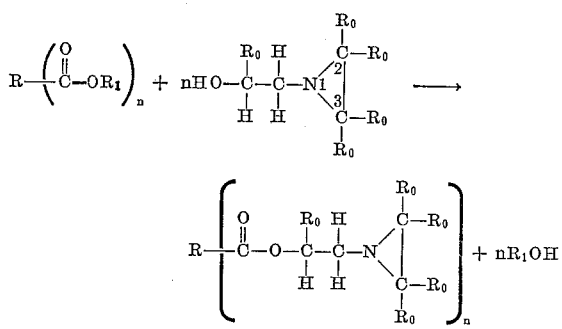

wherein R may be a hydrogen atom and each of R and $R_1$ may be a hydrocarbyl group of valence $n$ with from 1 to 17 carbon atoms, $n$ is an integer from 1 to 2 and each $R_0$ (which may be the same or different) is hydrogen or a lower alkyl group of from 1 to 4 carbon atoms (methyl, ethyl, n-propyl, i-propyl, n-butyl, i-butyl, sec.-butyl and t-butyl). Typical hydrocarbyl R groups include alkylene groups of from 1 to 10 carbon atoms (such as methylene, ethylene, propylene and butylene groups:

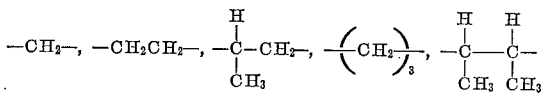

and $-(CH_2)_4-$, as well as higher groups $CH_3 CH_3$ such as $-(CH_2)_{10}-$), alkyl groups of up to 17 carbon atoms (such as the lower alkyl groups as well as pentyl, hexyl, heptyl, octyl, nonyl, decyl, undecyl, dodecyl, tridecyl, tetradecyl, pentadecyl, hexadecyl and heptadecyl groups), olefinically unsaturated groups of from 2 to 4 carbon atoms [such as vinyl, allyl, propenyl ($-CH=CHCH_3$), crotyl ($-CH_2CH=CHCH_3$)

isopropenyl

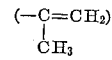

α-butenyl ($-CH=CHCH_2CH_3$)
and
γ-butenyl ($-CH_2CH_2CH=CH_2$)]

the phenyl group, benzyl, cinnamyl and phenylethyl. R may contain acetylenic linkages but is preferably free of such bonds. $R_1$ is preferably an alkyl group of from 1 to 17 carbon atoms. When R is a methylene group and $n$ is 2, it is preferable to carry out the reaction with an excess of aziridinyl alcohol reactant.

Typical examples of starting aziridinyl alcohols (named according to the Geneva system with the hydroxyl position given the lowest number) include 2-(1-aziridinyl)-ethanol, 2-(1-aziridinyl)-1 - propanol, 2-(2,3 - dimethyl- 1 - aziridinyl)-1-butanol, 2(2,2-diethyl-1-aziridinyl)-ethanol, 2-(2-n-butyl-1-aziridinyl)-ethanol, 1 - (2 - methyl-3-ethyl-1-aziridinyl)-2 - butanol and 1 - (1 - aziridinyl)-2-hexanol. These and other (1-aziridinyl)-alkanols may be prepared by reacting aziridine or an alkyl-substituted aziridine compound with an epoxyalkane. A suitable method of preparation is disclosed in U.S. Patent 2,475,068 to Wilson, the teachings of which are incorporated herein by reference.

The ester which is reacted with the aziridinyl alcohol may be any ester of a carboxylic acid which will exchange with the aziridinyl alcohol. Ordinarily, esters of carboxylic acids and alkanols are employed. Examples of suitable esters include esters of the fatty acids and dicarboxylic saturated and unsaturated acids such as methyl formate, ethyl formate, methyl acrylate, ethyl acrylate, n-propyl acrylate, n-butyl acrylate, methyl methacrylate, ethyl methacrylate, i-propyl methacrylate, n-butyl methacrylate, methyl cinnamate, ethyl butyrate, methyl butyrate, n-propyl butyrate, ethyl acetate, ethyl stearate, methyl propionate, ethyl propionate, methyl benzoate, ethyl benzoate, dimethyl oxalate, dimethyl adipate, diethyl adipate, dimethyl succinate, methylethyl succinate, dimethyl maleate, diethyl malonate, diethyl azelate, dimethyl pimelate, dimethyl suberate, dimethyl glutarate and dimethyl glutaconate. Preferred esters of dicarboxylic acids may be represented by the formula

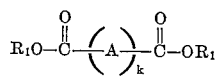

wherein each $R_1$ (which may be the same or different) is as previously defined and is preferably an alkyl group of from 1 to 17 carbon atoms (including the lower alkyl groups of from 1 to 4 carbon atoms and pentyl, hexyl, heptyl, octyl, nonyl, decyl, undecyl, dodecyl, tridecyl, tetradecyl, pentadecyl, hexadecyl and heptadecyl groups), A is an alkylene group of from 1 to 10 carbon atoms as previously exemplified and $k$ is an integer from 0 to 1 such that when $k$ is zero, the two carboxyl groups are directly joined and the formula represents esters of oxalic acid.

Another preferred group of ester reactants include the acrylate and methacrylate esters represented by the formula

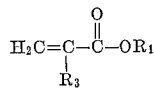

wherein $R_1$ is as previously defined and $R_3$ represents the hydrogen atom or a methyl group.

The ester exchange reaction is generally carried out in the presence of an alkali metal alkoxide catalyst (such as sodium methoxide, potassium methoxide, sodium ethoxide or sodium tertiary-butoxide, for example) or an alkali metal aziridinyl alkoxide (such as sodium-2-(1-aziridinyl)ethoxide, potassium-2-(1 - aziridinyl)ethoxide, sodium-2-(1-aziridinyl)-n-propoxide, etc.) corresponding to the formula

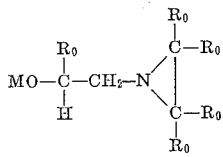

wherein M represents an alkali metal atom (Na, K, Li, for example, and $R_0$ is as previously defined in reaction I. Preferred metal aziridinyl alkoxides which are used in the reaction are those wherein the aziridinyl alkoxide portion of the molecule corresponds to the aziridinyl alcohol

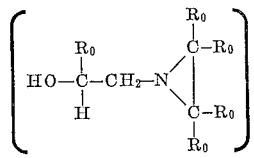

to be exchanged. These compounds may be added individually or may be formed in situ by merely adding an alkali metal (preferably in finely divided form) to the aziridinyl alcohol in the reaction mixture. Catalytic amounts (usually from .001 to .25 mole of alkali metal per mole of aziridinyl alcohol, either free or combined to form organic oxides) promote the reaction.

The process is generally carried out under reflux conditions (from about 50 mm. of Hg to atmospheric pressure) using temperatures of from about 25° to 110° C. (preferably from about 50° to 110° C. at atmospheric pressure). The lower boiling reactant is generally used in excess. Molar ratios of lower boiler:higher boiler may range from 3:1 to about 10:1. For example, with the reactants ethyl acetate and N-(2-hydroxyethyl)aziridine, the mole ratio of the lower boiling ethyl acetate to the higher boiling N-(2-hydroxyethyl)aziridine can be 10:1.

The compounds of the invention are useful as inhibitors to retard or prevent the reaction of aluminum with various degreasing solvents such as 1,1,1-trichloroethane and other halogenated solvents. Only an inhibiting amount of the compound is necessary. Amounts of up to 10 to 15 percent by weight of aziridinyl ester compound are sufficient to inhibit the decomposition of 1,1,1-trichloroethane by aluminum. Preferably, amounts of from about 0.01 percent to about 3.0 percent are used for the most economical inhibitor systems.

In addition, the compounds of the invention may be rearranged under suitable reaction conditions according to the equation:

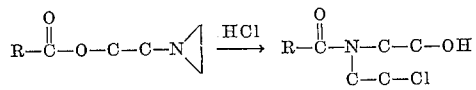

wherein R is as defined in Equation I. Furthermore, the compounds of the invention inhibit or prevent the growth of *E. coli* and may be used for this purpose in either concentrated or dilute solutions in any suitable solvent.

The following examples are illustrative only and are not to be construed as limiting the scope of the invention in any way.

*Example I*

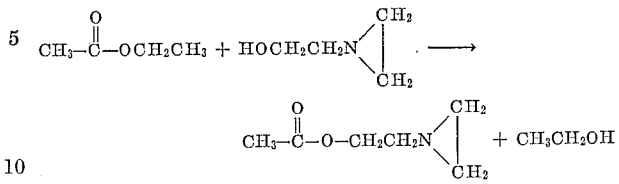

Into a three-liter distillation flask was placed 1,762 grams (20 moles) of ethyl acetate (dried to a water content of less than 100 parts per million over zeolite molecular sieves type 5A with cavity diameters of approximately 11.4 A., available from the Linde Company). The flask was connected to a two foot, copper-packed distillation column and the ethyl acetate was brought to reflux (77° C.) at atmospheric pressure. To the refluxing ethyl acetate was added 164.5 grams (about 2.0 moles) of N-(2-hydroxyethyl)aziridine containing 9.5 grams (0.087 mole) of sodium -2-(1-aziridinyl)ethoxide over a twenty-nine minute period. The mixture was refluxed for seven hours with simultaneous removal of 940 milliliters of ethanol-ethyl acetate azeotrope. The 2-(1-aziridinyl)ethyl acetate product (185.5 grams; 1.43 moles) was separated under reduced pressure (99°–100° C. at 63 mm. of Hg). The yield of 2-(1-aziridinyl)ethyl acetate (based upon a 98.2 percent conversion of N-(2-hydroxyethyl)aziridine determined by vapor phase chromatography) was 73.4 percent of theory. The 2-(1-aziridinyl)ethyl acetate had a specific gravity at 20° C. of 1.004 and a refractive index (Na D line) at 25° C. of 1.4315.

*Analysis (percent by weight)*.—Found: C, 55.7; H, 8.68; N, 10.7; $C_2H_4N$ (aziridinyl), 32.4. Calculated: C, 55.8; H, 8.58; N, 10.85; $C_2H_4N$ (aziridnyl), 32.5.

The aziridinyl group was determined by the amount of HI which added to the compound.

*Example II.—Preparation of 2-(1-arizidinyl) ethyl butyrate*

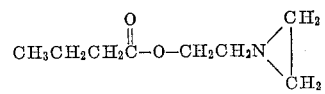

Into a one-liter distillation flask fitted with a 500 milliliter addition funnel and connected to a distillation column was placed 1220.5 grams (10.5 moles) of ethyl butyrate. The addition funnel was charged with 333 grams (3.83 moles) of N-(2-hydroxyethyl) aziridine and 19 grams (0.174 mole) of sodium 2-(1-aziridinyl)ethoxide. The distillation of the ethyl butyrate was started at 85° C. and atmospheric pressure. After 10 milliliters of ethyl butyrate had been distilled, the material in the addition funnel was added to the distilling ethyl butyrate over a 40 minute period. During this time, an additional 60 milliliters of ethyl butyrate distilled. The 2-(1-aziridinyl)ethyl butyrate distilled at 66° C. and 1.5 mm. of Hg giving 380.5 grams (2.42 moles) of product. The yield of 2-(1-aziridinyl)ethyl butyrate by vapor phase chromatography was 67.5 percent of theory based upon a 93.8 percent by weight conversion of N-(2-hydroxyethyl) aziridine. The 2-(1-aziridinyl)ethyl butyrate had a specific gravity at 20° C. of 0.958 and a refractive index (Na D line) of 1.4331 at 24° C.

*Analysis (percent by weight)*.—Found: C, 60.25; H, 9.14; N, 9.00; $C_2H_4N$, 26.9. Calculated: C, 61.1; H, 9.61; N, 8.91; $C_2H_4N$, 26.7.

*Example III.—Preparation of 2-(1-azirindinyl)ethyl methacrylate*

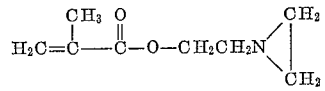

Into a two-liter distillation flask was placed 1094.7 grams (10.94) moles) of freshly distilled methyl methacrylate. To this was added 22 grams of N,N'-diphenyl-p-phenylenediamine as a polymerization inhibitor. The flask was attached to an 18 inch distillation column and heated to distill one hundred milliliters of methyl methacrylate in order to remove traces of water. To the dried methyl methacrylate was added 87.1 grams (1.0 mole) of N-(2-hydroxyethyl) aziridine and the mixture brought to a boil. The heat was removed and 0.3 gram of sodium was added to the reaction mixture in small pieces. Heat was again applied and in 30 minutes, 69 milliliters of methyl methacrylate was distilled. The conversion of N-(2-hydroxyethyl) aziridine was 90.8 percent by vapor phase chromatography. After one hour, the conversion was 97.2 percent by weight and after one and one-half hours, the conversion was 98.5 percent. The reaction product was cooled, filtered and distilled. The 2-(1-aziridinyl) ethyl methacrylate cut was taken at 44° to 50° C. at 0.1 mm. of Hg and weighed 137.6 grams. Vapor phase chromatography showed this product contained 93.5 percent by weight of 2-(1-aziridinyl)ethyl methacrylate. This represents a yield of 85 percent of theory based upon a 98.5 percent by weight conversion of N-(2-hydroxyethyl) aziridine. The redistilled 2-(1-aziridinyl)ethyl methacrylate had a specific gravity of 0.990 at 20° C. and a refractive index (Na D line) of 1.4585 at 20° C.

*Analysis (percent by weight).*—Found: Olefinic carbons (C=C), 15.4; $C_2H_4N$, 26.8. Calculated: Olefinic carbons (C=C), 15.48; $C_2H_4N$, 27.1.

*Example IV.—Preparation of 2-(1-aziridinyl)ethyl acrylate*

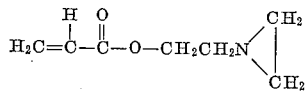

Into a one-liter distillation flask was placed a mixture of 502 grams (5.02 moles) of ethyl acrylate containing 0.4 percent by weight (based upon the weight of the ethyl acrylate) of N,N'-diphenyl-p-phenylenediamine polymerization inhibitor. The flask was connected to a copper-packed distillation column and heated to 88° C. at atmospheric pressure. To the mixture in the flask was added 85.2 grams of N-(2-hydroxyethyl) aziridine over a 15 minute period. One hour and twenty minutes later, 0.1 gram of metallic sodium was added to the solution. During the reaction, ethanol and ethyl acrylate were removed by distillation. Analysis of the crude product by vapor phase chromatography showed that the crude product contained a 40 percent yield of 2-(1-aziridinyl)ethyl acrylate based upon a 100 percent conversion of N-(2-hydroxyethyl) aziridine. The distillation gave 30.8 grams of 2-(1-aziridinyl)ethyl acrylate (distilled at 37° C. and 0.75 mm. of Hg) which was 99+ percent purity as measured by aziridinyl ring content (addition of HI to the aziridinyl group).

The 2-(1-aziridinyl)ethyl acrylate had a specific gravity at 20° C. of 1.014 and a refractive index at the same temperature (Na D line) of 1.4642.

*Analysis (percent by weight).*—Found: C, 60.77; H, 7.74; N, 9.86; $C_2H_4N$, 17.0. Calculated: C, 59.6; H, 7.85; N, 9.93; $C_2H_4N$, 17.02.

*Example V.—Preparation of 2-(1-aziridinyl)ethyl benzoate*

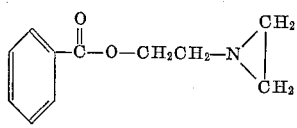

Into a two-liter round bottom flask equipped with a nitrogen sparger and a thermometer was placed 477.6 grams (5.47 moles) of N-(2-hydroxyethyl) aziridine and 2.4 grams of sodium 2-(1-aziridinyl)ethoxide. To this was added 136.3 grams (1 mole) of methyl benzoate and the reaction mixture was heated to 50° C. Methanol was removed at a reduced pressure throughout the reaction period of 75 minutes. The excess N-(2-hydroxyethyl) aziridine was removed at temperatures up to 71° C. at 0.24 mm. of Hg. The product 2-(1-aziridinyl)ethyl benzoate (165 grams; about .86 mole) was collected at from 90° to 100° C. at 0.13 mm. of Hg. The yield was 86.2 percent of theory based upon a 100 percent conversion of methyl benzoate. The product had a specific gravity of 1.100 at 20° C. and a refractive index of 1.5193 at 23° C. (Na D line).

*Analysis (percent by weight).*—Found: C, 69.06; H, 6.74; N, 7.55; $C_2H_4N$, 22.6. Calculated: C, 69.04; H, 6.85; N, 7.33; $C_2H_4N$, 21.96.

*Example VI.—Preparation of di[2-(1-aziridinyl)ethyl] adipate*

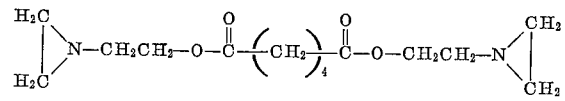

Into a one-liter distillation flask fitted with a nitrogen sparger was placed 345.7 grams (about 3.99 moles) of N-(2-hydroxyethyl) aziridine containing 4.7 grams of sodium 2-(1-aziridinyl)ethoxide. To this mixture 174.0 grams (1 mole) of dimethyl adipate was added and the flask was connected to a distillation column. The reaction mixture was heated to 60° C. and methanol was removed at reduced pressure throughout the reaction period of one hour. The excess N-(2-hydroxyethyl) aziridine was removed at up to 72° C. at 0.24 mm. of Hg. The di[2-(1-aziridinyl)ethyl] adipate was collected at 135° C. and 0.2 mm. of Hg and yielded 166.8 grams (about .58 mole). This represents a recovered yield of 58.0 percent di[2-(1-aziridinyl)ethyl] adipate based on 100 percent conversion of dimethyl adipate. The following physical properties of di[2-(1-aziridinyl)ethyl] adipate were obtained: $\eta_D{}^{23}$ of 1.4674; specific gravity at 20° C. of 1.079.

*Analysis (percent by weight).*—Found: C, 59.09; H, 8.35; N, 10.02; $C_2H_4N$, 29.5. Calculated: C, 59.2; H, 8.46; N, 9.86; $C_2H_4N$, 29.6.

*Example VII.—Preparation of 2-(1-aziridinyl)isopropyl acetate*

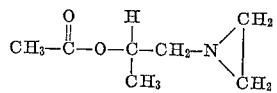

Into a three-liter distillation flask was placed 1760 grams of ethyl acetate that had been dried to less than 100 parts per million water using number 5A molecular sieves as in Example I. The flask was connected to a four foot helix-packed distillation column and was brought to reflux conditions at 77° C. and atmospheric pressure. To this was added 194.3 grams (about 1.92 moles) of N-(2-hydroxy-n-propyl) aziridine containing 9.5 grams of sodium 2-(1-aziridinyl)-n-propoxide while distilling ethyl acetate over a period of ten minutes. The reaction was allowed to continue for 5½ hours while 1214.6 grams of an azeotrope of ethanol-ethyl acetate was removed. The residue from the above distillation was charged to a distillation column and a crude product cut of 215.4 grams was taken at 39° C. to 41° C. and 0.54 mm. of Hg. This 215.4 grams plus 528.6 grams of xylene was placed in a liter distillation flask and again connected to the four foot column to azeotrope the N-(2-hydroxy-n-propyl)aziridine with xylene away from the 2-(1-aziridinyl)isopropyl acetate. The 2-(1-aziridinyl)isopropyl acetate cut was taken at 45° C. and 2.25 mm. of Hg and weighed 151.4 grams. The cut was 98.8 percent pure by vapor phase chromatography. This cut represented a recovered yield of 68.3 percent of 2-(1-aziridinyl)isopropyl acetate based on a 79.6 percent conversion of N-(2-hydroxy-n-propyl)aziridine by vapor phase chromatography. The following physical properties for 2-(1-aziridinyl)isopropyl acetate were obtained: $n_D^{23}$ of 1.4294.

*Analysis (percent by weight).*—Found: C, 59.55; H, 9.17; N, 10.28; $C_2H_4N$, 28.1. Calculated: C, 58.7; H, 9.16; N, 9.78; $C_2H_4N$, 29.35.

We claim as our invention:

1. A compound of the formula

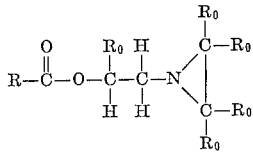

wherein:
 (a) R is selected from the group consisting of the hydrogen atom, an alkyl group of from 1 to 17 carbon atoms, an olefinically unsaturated hydrocarbyl group of from 2 to 4 carbon atoms, phenyl, benzyl, cinnamyl, or phenethyl, and
 (b) each $R_0$ is independently selected from the group consisting of the hydrogen atom and a lower alkyl group.

2. A compound of the formula

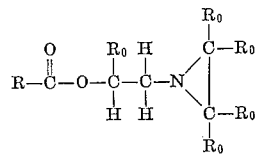

wherein:
 (a) R is an alkyl group of from 1 to 17 carbon atoms, and
 (b) each $R_0$ is independently selected from the group consisting of the hydrogen atom and a lower alkyl group.

3. A compound of the formula

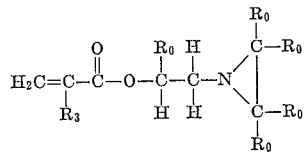

wherein:
 (a) each $R_0$ is independently selected from the group consisting of the hydrogen atom and a lower alkyl group, and
 (b) $R_3$ is selected from the group consisting of the hydrogen atom and the methyl group.

4. The compound:

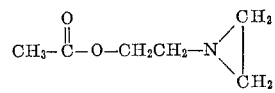

5. The compound:

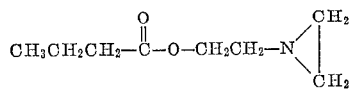

6. The compound:

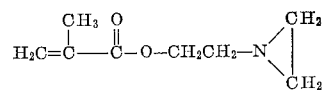

7. The compound:

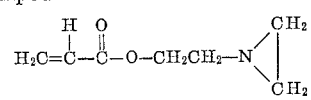

8. The compound:

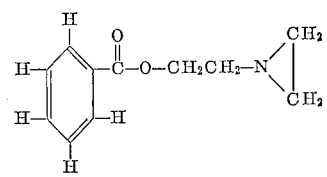

9. The compound:

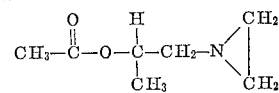

References Cited

FOREIGN PATENTS 693,611   7/1953   Great Britain.

OTHER REFERENCES

Groggins, Unit Processes in Organic Synthesis (New York, 1947), pp. 635–637.

Hendry et al., Brit. Journal Pharmacol. Chem., vol. 6, p. 362 (1951).

Tsou et al., J. Med. Chem., vol. 6, pp. 435–9 (1963).

ALTON D. ROLLINS, *Primary Examiner.*

ALEX MAZEL, HENRY R. JILES, *Examiners.*